Sept. 20, 1960 R. S. HALL ET AL 2,952,973
TURBOFAN-RAMJET ENGINE
Filed June 2, 1958 4 Sheets-Sheet 1

INVENTORS
Russell S. Hall &
BY Douglas Johnson
Paul Fitzpatrick
ATTORNEY

INVENTORS
Russell S. Hall &
Douglas Johnson
BY Paul Fitzpatrick
ATTORNEY

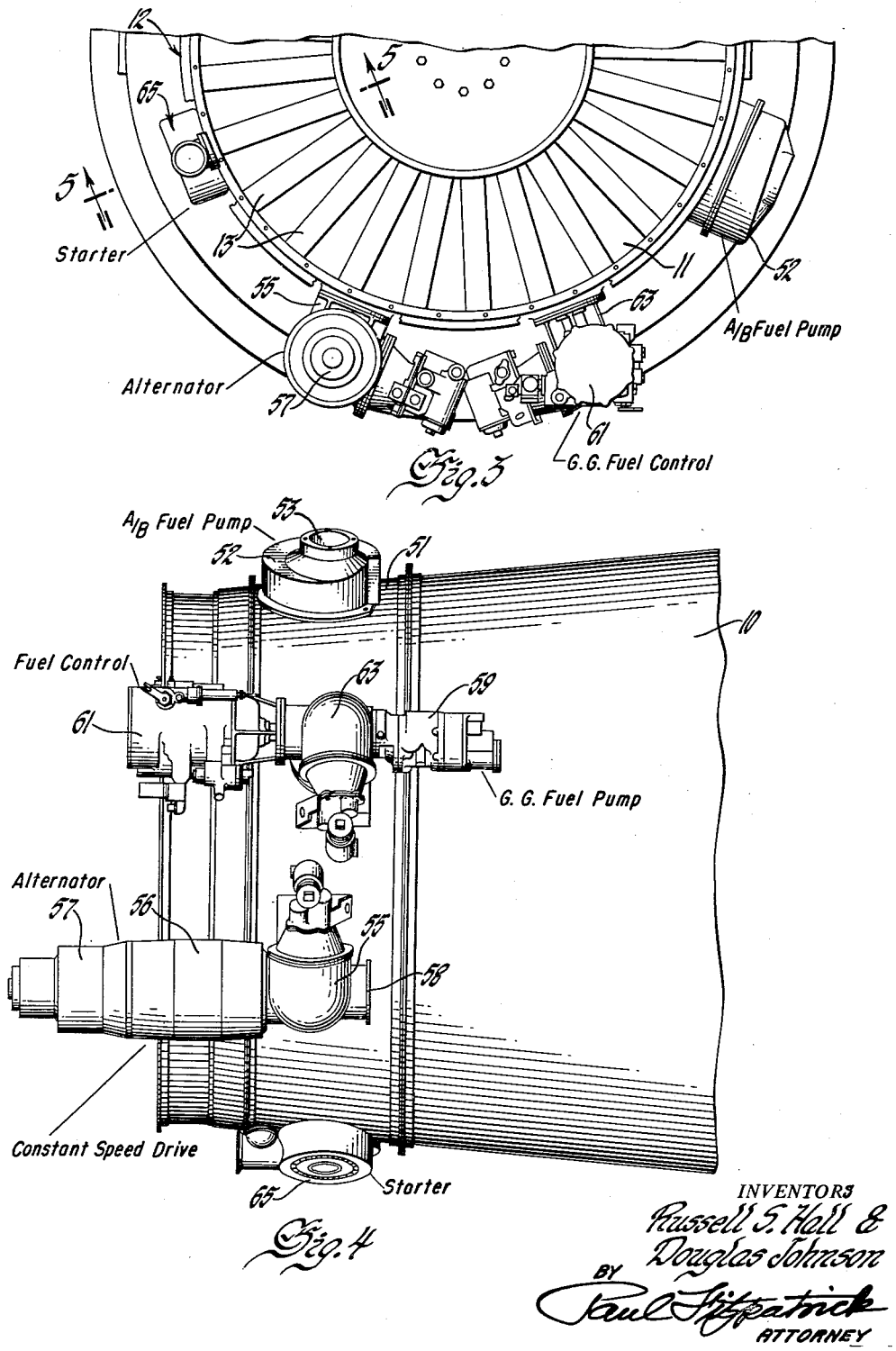

United States Patent Office 2,952,973
Patented Sept. 20, 1960

2,952,973
TURBOFAN-RAMJET ENGINE

Russell S. Hall and Douglas Johnson, Indianapolis, Ind., assignors to General Motors Corporation, Detroit, Mich., a corporation of Delaware Filed June 2, 1958, Ser. No. 740,986

6 Claims. (Cl. 60—35.6)

Our invention relates to jet propulsion engines and particularly to an engine which may be called a turbofan-ramjet engine adapted to operate as a ducted fan gas turbine jet engine at low forward speeds and essentially as a ramjet engine at relatively high forward speeds.

The invention is particularly concerned with certain auxiliary features of the engine including the drive of engine accessories and the means for starting the engine.

The nature and objects of the invention and the advantages thereof will be clear to those skilled in the art from the succeeding detailed description of the preferred embodiment of the invention and the accompanying drawings thereof.

Figure 3 is a partial front view of the engine.

Figure 4 is a view from below of the forward end of the invention.

Figure 1:
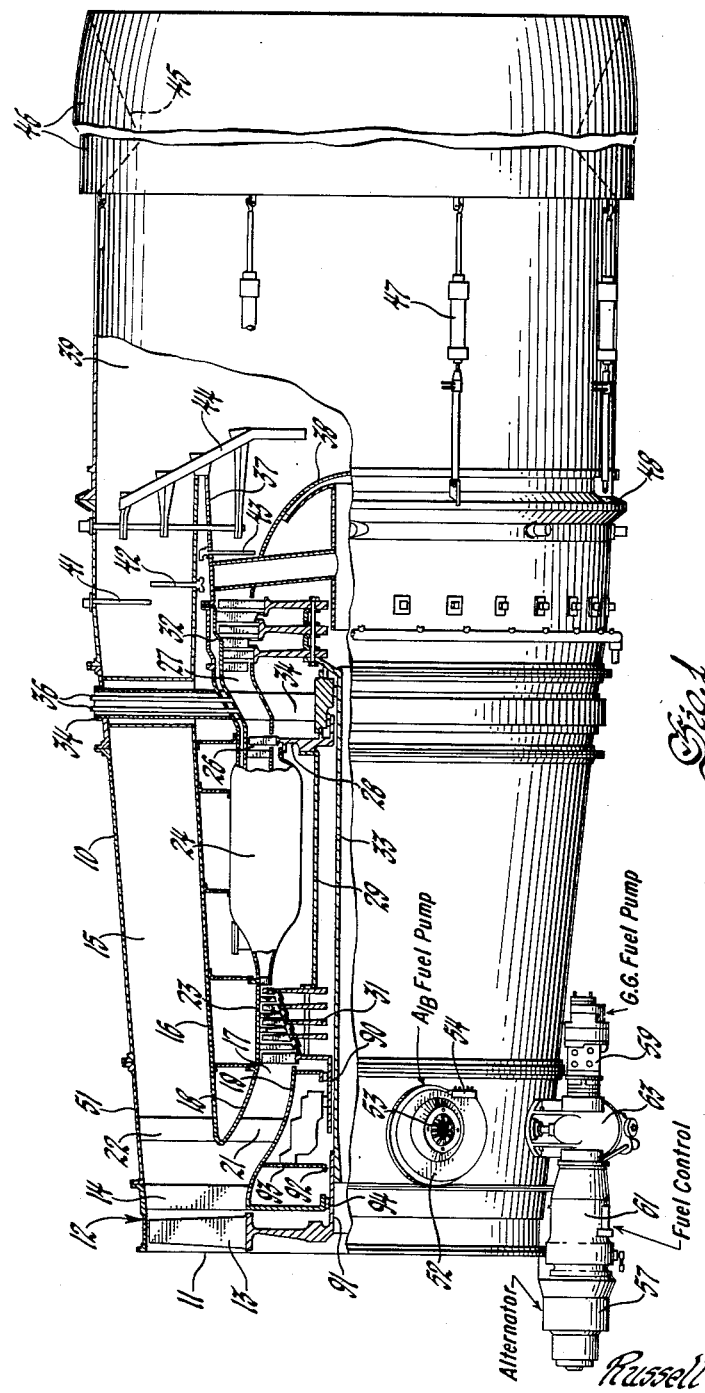
Figure 1 is a left side view of an engine embodying the invention with parts cut away and in section.

Referring first to Figure 1 for a general description of the engine, it comprises an outer casing or shell 10 composed of a number of sections suitably connected together. Air enters the annular air inlet 11 of the engine through suitable intake ducting (not shown) and passes through a fan or single stage compressor 12 comprising a bladed rotor 13 and outlet vanes 14. The discharge from the fan is divided between an annular bypass duct 15 defined by the outer case 10 and an inner annular wall 16 and an annular inlet 17 to a gas generator. The inlet 17 is defined by annular walls 18 and 19, these walls being connected to the outer case by struts 21 and 22. The engine has a high bypass ratio, about 80% of the air being directed through duct 15.

The gas generator comprises a multi-stage axial flow compressor 23, combustion apparatus 24, and a single stage turbine 26 which discharges into an exhaust duct 27. The rotor 28 of the turbine is connected by an outer shaft 29 to the rotor 31 of the compressor 23. The gas generator is similar to the usual axial-flow jet engine compressor, combustion apparatus, and turbine combination.

The gas generator turbine exhaust duct 27 supplies motive fluid to a second or low pressure turbine 32 which, as illustrated, is a three-stage turbine connected by an inner shaft 33 to the rotor 13 of the fan. Struts 34 extending across the bypass duct 14 and exhaust duct 27 support bearings for the turbine shafts and may house conduits 36 for oil or cooling air.

The second turbine exhausts through an exhaust passage defined by an annular case or shroud 37 and an inner wall or tailcone 38 into an engine exhaust duct 39 in which combustion takes place. The bypass duct 15 also discharges into the engine exhaust duct 39. The second combustion apparatus comprises three rows of fuel spray bars 41, 42, and 43. The first two discharge into the bypass duct 15 and the third into the low pressure turbine exhaust. A flameholder structure 44 mounted in the forward end of the engine exhaust duct serves to stabilize the flame resulting from combustion of the fuel supplied through the spray tubes 41, 42 and 43. Combustion takes place in the second combustion chamber or afterburner defined by the engine exhaust duct 39 downstream of the flameholder.

The exhaust duct 39 terminates in a variable jet nozzle 45, which ordinarily may be any suitable convergent-divergent type nozzle. The areas of the throat and outlet of the nozzle may be varied by an axially movable shroud 46 shifted by a number of hydraulic cylinders 47 coupled to the shroud 46 and a flange 48 on the case 10.

The engine is started by cranking the high pressure or gas generator rotor 28, 31 and supplying fuel to the combustion apparatus 24. When the gas generator is started, the exhaust from the gas generator drives turbine 32 and thereby fan 12. For take-off and normal flight fuel is also supplied to the afterburner combustion apparatus which heats the air delivered through the bypass duct as well as reheating the turbine exhaust. The bypass air and turbine exhaust gases are mixed, heated and discharged through the exhaust nozzle 45. This mode of operation is that of a two-spool bypass turbojet engine with an afterburner.

In very high speed flight, compression of the inlet air due to ram is quite substantial. The supply of fuel to the first or gas generator combustion apparatus 24 is cut off and fuel is supplied only to the second or afterburner combustion apparatus. Compression is effected only by ram and, as will be apparent, the engine operates as a ramjet, with no compression of the air by the fan or compressor. Under these conditions, fan 13 will windmill in the air stream entering the engine. The gas generator turbine and compressor will also windmill to some extent, but this is immaterial. The fan 13 is of such design that it operates efficiently as a windmill and provides sufficient energy during such high speed flight to operate a pump which supplies the power to the afterburner fuel pump and also to drive service auxiliaries for external power requirements such as a hydraulic fluid pump and an alternator. The fuel pump and such service auxiliaries are, therefore, coupled to the fan shaft 33 so as to be driven by the low pressure turbine 32 at low aircraft speeds or by the fan 13 at high speeds.

The gas generator turbine is coupled to drive a fuel pump and controls for the gas generator turbine and is also coupled to an engine starter which is used not only for initial starting of the entire engine on the ground, but also for restarting the gas generator in flight. When the engine has been operating as a ramjet and aircraft speed is to be decreased, it becomes necessary to restart the gas generator turbine. It does not windmill at high enough speed under the conditions in which it is started to make it possible to start the gas geneartor without driving the shaft. Starting of the gas generator is accomplished by an air operated starter of the turbine type which is provided with supply connections so that it may be energized from an external source for ground starting of the engine or be supplied with ram air for in-flight starting.

The various accessory devices referred to above are mounted on the exterior of the engine near the inlet end as illustrated in Figures 1, 3 and 4, specifically on the section 51 of the case which connects the fan and the high pressure compressor. The afterburner fuel pump 52 has an inlet 53 and outlet 54 connected by pipes (not shown) to the fuel supply and to the afterburner spray bars. This pump is driven by a radial shaft geared to the fan shaft 33. A second radial shaft driven by the fan shaft 33 is coupled through an accessory drive box 55 and a constant speed drive device 56 to an aircraft service alternator 57. The same drive box is coupled to a hydraulic fluid supply pump (not shown) which may be bolted on the mounting pad 58.

A third radial drive shaft, driven by the gas generator turbine, is coupled to a gas generator fuel pump 59 and a gas generator fuel control 61, these being fixed to a gear case 63 mounted on the casing section 51. A starter 65 of the air turbine type also mounted on casing section 51 is coupled through a radial shaft and an overrunning clutch to the gas generator shaft.

Figure 5:
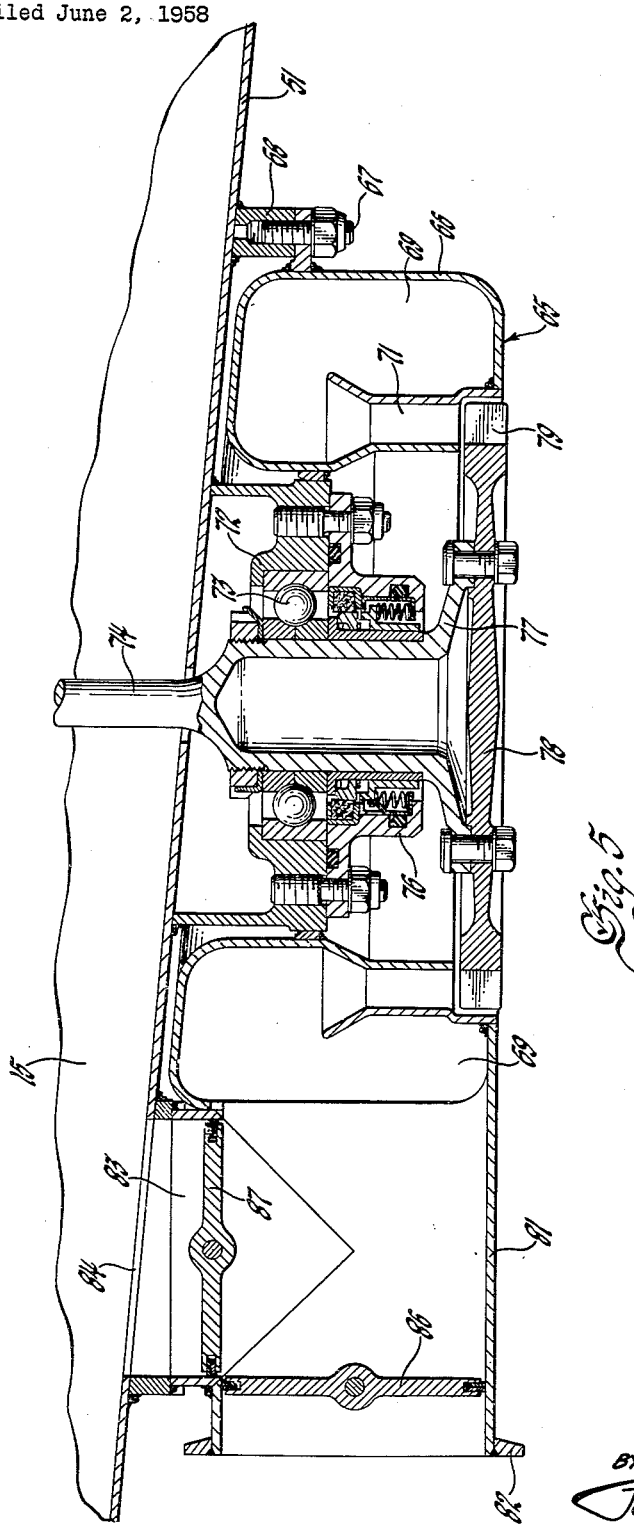
Figure 5 is a sectional view of the engine starter taken on the plane indicated by the line 5—5 in Figure 3.

The structure of the starter and the air connections thereto are illustrated in Figure 5. The stationary structure of the starter comprises a case 66 fixed by studs 67, threaded in bosses 68, to the casing section 51. The case defines an air inlet scroll 69 for the turbine and has mounted in it an annular nozzle 71 supplied from the inlet scroll. An annular bearing support 72 welded to the engine case mounts ball bearing 73 which supports the starter turbine shaft 74 extending radially into the engine. A shaft seal assembly 76, which may be of known type, is provided between the bearing 72 and a flange 77 on the shaft to which the turbine disk 78 mounting blades 79 is fixed. The turbine exhausts to static air pressure.

The inlet scroll 69 is supplied with air under pressure through a duct 81 which terminates in a flange 82 for connection to an external source of compressed air for ground starts. A branch 83 of conduit 81 communicates with an opening 84 through the casing into the bypass air duct 15 slightly downstream from the fan 12. Standard butterfly valves 86 and 87 provide for connecting the starter air supply line 81 either to the external compressed air supply or to the bypass duct 15. Valve 86 is opened for ground starts and valve 87 for air starts.

Figure 2:
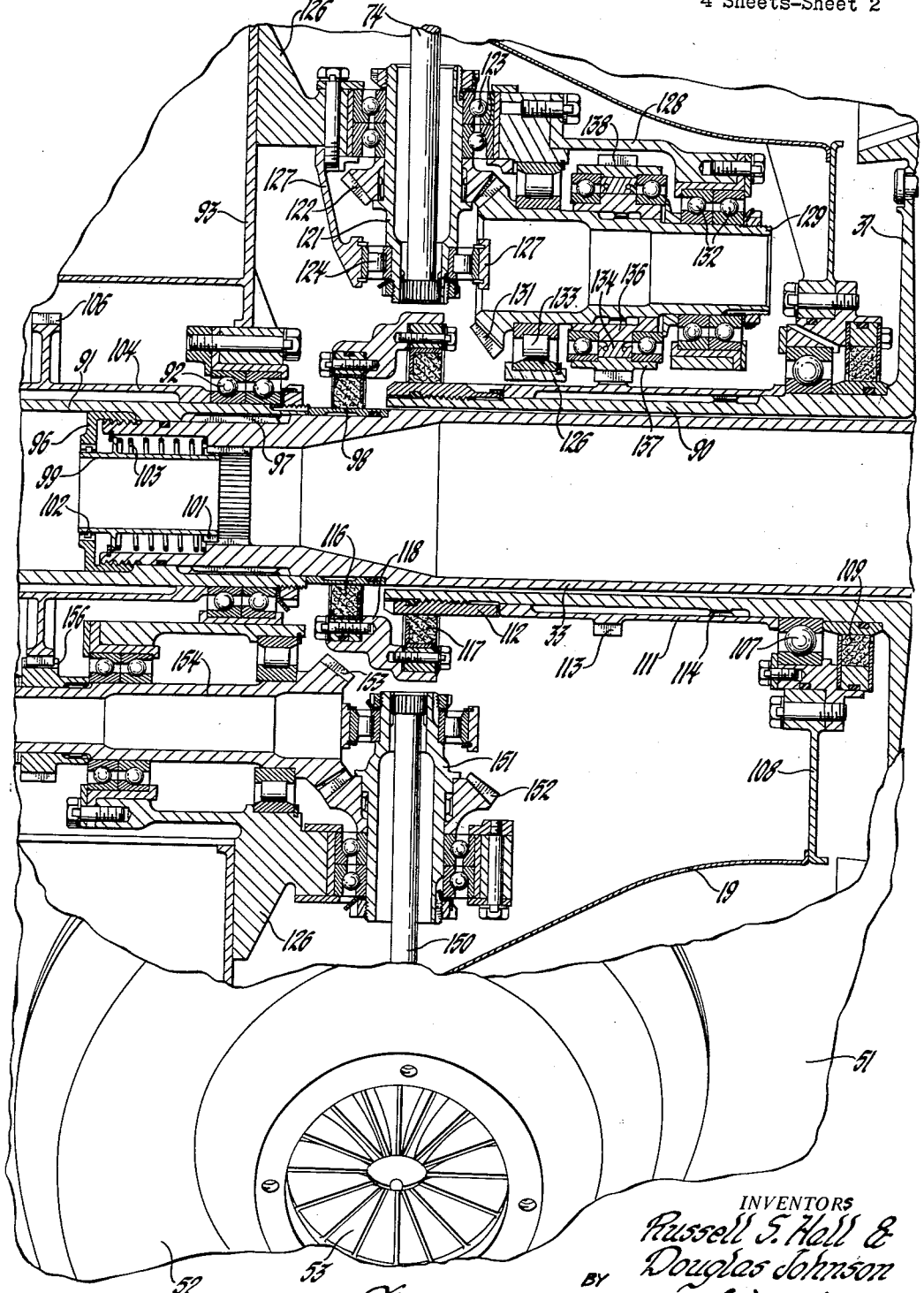
Figure 2 is a partial view, principally in section, illustrating the coupling of accessory drive shafts to the main engine shafts.

We may now refer to Figure 2 for the connection of the radial accessory drive shafts previously mentioned to the engine shafts 29 and 33 identified in Figure 1. Figure 2 shows at the right the forward disk of the compressor rotor 31 which has a shaft 90 projecting forward which may be regarded as a continuation of shaft 29. Shaft 33 which is driven by the low pressure turbine extends through shaft 90 and is coupled to a shaft 91 on which the fan rotor 13 is mounted and which may be considered a continuation of shaft 33. Shaft 91 is supported in ball bearings 92 mounted in a web 93 extending inwardly from the inner wall 19 of the air duct and also in a bearing 94 (Figure 1). Shafts 33 and 91 are coupled by a nut 96 threaded onto the end of shaft 33 and bearing against an internal shoulder of shaft 91. The two shafts are splined at 97 and the rear end of shaft 91 bears against a seal ring 98 which engages a shoulder of shaft 33. The nut 96 is held against backing off by a locking device comprising a sleeve 99 having splines 101 engaging internal splines in shaft 33 and splines 102 engageable with internal splines in the nut 96. Sleeve 99 may be pushed rearwardly against the action of a compression spring 103 to permit nut 96 to be turned, but otherwise locks it to shaft 33.

The ball bearings 92 for shaft 91 are retained on the shaft and on the web 93 by obvious structure. A sleeve 104 fixed on shaft 91 and coupled to it by splines (not shown) is integral with an accessory drive gear 106 by which power is taken from the fan shaft to drive certain of the radial shafts.

Shaft 90 is supported in a ball bearing 107 mounted in the obvious manner in a web 108 extending inwardly from the wall 19 of the air duct. A suitable oil seal 109 is mounted adjacent the bearing. The bearing 107 and a sleeve 111 are retained on the shaft 90 by a spanner nut 112. A pinion 113 is integral with the sleeve 111 which is splined to the shaft at 114. Pinion 113 couples shaft 90 and thereby the compressor and high pressure turbine to the starter and the gas generator driven accessories. Suitable shaft seals 116 and 117 bearing against spanner nut 112 and seal ring 98 prevent leakage of oil into the space between the shafts. These seals are mounted on a mounting ring 118 supported by the web 93.

It may be best to describe first the connection from the starter to pinion 113. As previously mentioned, the starter turbine 65 has a shaft 74 extending radially into the engine. The inner end of this shaft is splined to a sleeve 121 to which is splined a bevel gear 122. The sleeve is mounted in ball bearings 123 and a roller bearing 124 mounted in supports 126 and 127 fixed to the web 93. A further support 128 is bolted to support 126. An integral hollow shaft 129 and bevel gear 131 are mounted in ball bearings 132 in support 128 and roller bearing 133 mounted in support 126. Bevel gear 131 meshes with bevel gear 122, and shaft 129 is coupled to pinion 113 through an overrunning clutch mechanism 134. The overrunning clutch comprises an inner ring 136 splined to shaft 129, an outer ring 137 including a gear 138 meshed with pinion 113, and ball bearings and sprag elements or rollers between the rings 136 and 137. The overrunning clutch 134 provides a drive from the starter to shaft 74 to shaft 90, but overruns when the shaft overruns the starter.

The connection from the shaft 90 and pinion 113 to the accessory drive box 63 may be essentially the same as that from the starter just described, except that the overrunning clutch is omitted.

The connection from gear 106 to the fan driven accessories is also very much like that just described, with the omission of the overrunning clutch. Specifically, the afterburner fuel pump 52 is driven by a radial shaft 150 splined to a hollow shaft 151 mounting bevel gear 152 meshing with bevel gear 153 on a shaft 154 on which is mounted gear 156 meshing with gear 106. The arrangement of the bearings for these shafts is substantially the same as that for shafts 121 and 129.

It will be apparent that the structure just described provides a very compact and practical arrangement for coupling accessories to the two main engine shafts. The accessories which must operate at all times when the engine is in operation are coupled to the fan shaft so as to be driven either by the turbine 32 energized from the gas generator at low speeds or by the fan 13 at high speeds. The fuel pump and other accessories which need to operate only when the gas generator is in operation are driven by it, and the starter also is coupled to the gas generator which must be started to provide gas to drive the low pressure turbine and fan when the engine is started.

The detailed description of the preferred embodiment of the invention is not to be considered as limiting the invention, as many modifications may be made by the exercise of skill in the art without departing from the scope of the invention.

We claim:

1. A turbofan-ramjet type jet engine comprising, in combination, a gas generator including a compressor, first combustion apparatus, and a first turbine driving the compressor, a bypass duct bypassing the gas generator, an air inlet, a fan in the air inlet discharging into the bypass duct and the gas generator, a second turbine energized from the combustion apparatus and coupled to the fan, an exhaust duct supplied through the bypass duct and the turbines, second combustion apparatus in the exhaust duct, and a propulsion nozzle supplied from the exhaust duct, the fan being constructed to windmill at a high forward speed of the engine suited to ramjet operation thereof and the first combustion apparatus being normally inoperative at such high forward speed of the engine, and means connected to the fan for taking power therefrom.

2. A turbofan-ramjet type jet engine comprising, in combination, a gas generator including a compressor, first combustion apparatus, and a first turbine driving the compressor, a bypass duct bypassing the gas generator, an air inlet, a fan in the air inlet discharging into the bypass duct and the gas generator, a second turbine energized from the combustion apparatus and coupled to the fan, an exhaust duct supplied through the bypass duct and the turbines, second combustion apparatus in the exhaust duct, and a propulsion nozzle supplied from the exhaust duct, the fan being constructed to windmill at a high forward speed of the engine suited to ramjet operation thereof and the first combustion apparatus being normally inoperative at such high forward speed of the engine, means for supplying fuel to the second combustion apparatus and external service auxiliaries coupled to the fan so as to be driven thereby at such high forward speed, means for supplying fuel to the first combustion apparatus coupled to the gas generator turbine, and a starter coupled to the gas generator turbine.

3. A turbofan-ramjet type jet engine comprising, in combination, a gas generator including a compressor, first combustion apparatus, and a first turbine driving the compressor, a bypass duct bypassing the gas generator, an air inlet, a fan in the air inlet discharging into the bypass duct and the gas generator, a second turbine energized from the combustion apparatus and coupled to the fan, an exhaust duct supplied through the bypass duct and the turbines, second combustion apparatus in the exhaust duct, and a propulsion nozzle supplied from the exhaust duct, the fan being constructed to windmill at a high forward speed of the engine suited to ramjet operation thereof and the first combustion apparatus being normally inoperative at such high forward speed of the engine, an air-energized starter coupled to the gas generator turbine, means for supplying ram air to the starter from the bypass duct for air starts, and means for connecting the starter to an external air supply for ground starts.

4. A turbofan-ramjet type jet engine comprising, in combination, a gas generator including a compressor, first combustion apparatus, and a first turbine driving the compressor, a bypass duct bypassing the gas generator, an air inlet, a fan in the air inlet discharging into the bypass duct and the gas generator, a second turbine energized from the combustion apparatus and coupled to the fan, an exhaust duct supplied through the bypass duct and the turbines, second combustion apparatus in the exhaust duct, a propulsion nozzle supplied from the exhaust duct, the fan being constructed to windmill at a high forward speed of the engine suited to ramjet operation thereof and the first combustion apparatus being normally inoperative at such high forward speed of the engine, means for supplying fuel to the second combustion apparatus coupled to the fan, external service auxiliaries coupled to the fan, means for supplying fuel to the first combustion apparatus coupled to the gas generator turbine, an air-energized starter coupled to the gas generator turbine, means for supplying ram air to the starter from the bypass duct for air starts, and means for connecting the starter to an external air supply for ground starts.

5. A jet propulsion engine comprising, in combination, an air duct, a fan in the duct, a combustion apparatus in the duct downstream from the fan, a jet propulsion nozzle supplied by the combustion apparatus, and power means coupled to the fan for driving the fan, the fan being drivable by the power means to provide a propulsive jet at low forward speeds of the engine below those suited to ramjet operation thereof, and the fan being constructed to windmill and extract power from the air stream in the air duct at a high forward speed of the engine suited to ramjet operation thereof, the power means being normally deenergized at such high forward speed, and a fuel pump supplying the combustion apparatus coupled to the fan so as to be driven by the power means at such low forward speeds and by the fan at such high forward speed.

6. A jet propulsion engine comprising, in combination, an air duct, a fan in the duct, a combustion apparatus in the duct downstream from the fan, a jet propulsion nozzle supplied by the combustion apparatus, and power means coupled to the fan for driving the fan, the fan being drivable by the power means to provide a propulsive jet at low forward speeds of the engine below those suited to ramjet operation thereof, and the fan being constructed to windmill and extract power from the air stream in the air duct at a high forward speed of the engine suited to ramjet operation thereof, the power means being normally deenergized at such high forward speed, and engine accessories including a fuel pump supplying the combustion apparatus and external service accessories coupled to the fan so as to be driven by the power means at such low forward speeds and by the fan at such high forward speed.

References Cited in the file of this patent

UNITED STATES PATENTS

| 2,803,943 | Rainbow | Aug. 27, 1957 |

FOREIGN PATENTS

| 419,779 | Italy | Apr. 8, 1947 |
| 263,472 | Switzerland | Nov. 16, 1949 |